United States Patent [19]

Swenson et al.

[11] 4,375,168
[45] Mar. 1, 1983

[54] APPARATUS FOR LOW G-LEVEL VIBRATIONAL PULSE DETECTION

[75] Inventors: Richard M. Swenson; Jerome B. Franck, both of Ridgecrest, Calif.

[73] Assignee: The United States of America as represented by the Secretary of the Navy, Washington, D.C.

[21] Appl. No.: 250,813

[22] Filed: Apr. 3, 1981

[51] Int. Cl.³ .................................... G01H 11/00
[52] U.S. Cl. .................................. 73/658; 73/35; 102/427
[58] Field of Search .............. 73/658, 659, 661, 652, 73/654, 649, 584, 167, 35; 102/427; 368/118, 113; 367/145, 149, 168, 178; 340/665, 686, 690

[56] References Cited

U.S. PATENT DOCUMENTS

| | | | |
|---|---|---|---|
| 3,384,017 | 5/1968 | Lazarus et al. | 102/219 |
| 3,518,941 | 7/1970 | Keithley | 102/418 |
| 3,790,927 | 2/1974 | Chwastyk | 367/133 |
| 3,852,994 | 12/1974 | Pereda | 73/35 |
| 3,939,770 | 2/1976 | Amundson et al. | 102/427 |
| 3,975,942 | 8/1976 | Dreitzler et al. | 73/35 |
| 4,112,844 | 9/1978 | Held et al. | 102/427 |
| 4,300,135 | 11/1981 | Korn et al. | 73/652 |
| 4,301,735 | 11/1981 | Menne et al. | 102/427 |

*Primary Examiner*—Stephen A. Kreitman
*Attorney, Agent, or Firm*—R. F. Beers; W. Thom Skeer

[57] ABSTRACT

Apparatus is provided for monitoring vibrational activity proximate to a source of mechanical vibration. The apparatus includes a bridge rectifier which may be positioned proximate to the source, and which provides a voltage output when the source generates a pattern of mechanical vibrations of very low g-level over a brief time interval, such pattern comprising a low g-level vibrational pulse. The apparatus also includes an amplifier coupled to the bridge rectifier for amplifying the voltage output, and further includes a device responsive to the amplified voltage output for providing notice when the source generates a low g-level vibrational pulse. A timing device which is responsive to the amplified voltage output provides a record of the time which elapses between the occurrence of a specified event, which precedes the vibrational pulse, and the occurrence of the vibrational pulse.

8 Claims, 3 Drawing Figures

APPARATUS FOR LOW G-LEVEL VIBRATIONAL PULSE DETECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein generally pertains to the field of apparatus which is capable of detecting mechanical vibrations which are of very low g-level, and which are of such short duration that they may be considered to comprise a pulse of vibrations, or vibrational pulse. More particularly, the invention pertains to apparatus of the above type which employs a very inexpensive sensor element to detect the occurrence of a low g-level vibrational pulse. Even more particularly, the invention pertains to apparatus of the above type wherein a bridge rectifier device, such as a diode bridge, is employed as a transducer element to convert a low g-level vibrational pulse into a usable voltage signal.

It has become known to those of skill in the art that important advantages may be realized by including a timed self-detonating feature in certain types of land mines. By providing such feature, mines which are deployed against an enemy force will be rendered harmless, at a point in time which is known, if they are not first encountered by the enemy. After the known point in time, the mines will not pose a hazard to friendly forces which enter the area of mine deployment. The merit of including a timed self-detonating feature in a mine is shown in the prior art, for example, in U.S. Pat. No. 3,384,017, issued to Lazarus et al. on May 21, 1968, for a "Land Mine Control System".

It has been found that in the development of a time controlled self-detonation system for a land mine, stringent testing procedures may be required to insure that the system reliably activates a mine detonator at the conclusion of a prespecified period. As part of such testing procedures, it may be desirable or necessary to deploy on the order of 100–200 test mines in an operational environment, for example, by air drop. Each test mine would contain a detonator and a timed self-detonating system, but no explosive charge. Following deployment, the time elapsing between deployment and detonator activation would be monitored for each mine. Because of the large number of mines involved in such field test, because of the probable dispersal of the mines over a wide area, and because of the intended time period between deployment and self-detonation, which may be on the order of several weeks, such time monitoring efforts would be most accurately accomplished by dedicating a discrete monitoring device to each test mine, and placing it proximate thereto. However, when the detonator of a mine such as a land mine is activated, the only indication thereof is mechanical vibration which is of very low g-level, and which is of such short time duration that it may be thought of as a vibrational pulse. Consequently, in order to determine the time of operation of a self-detonation system employed by such mines, it is necessary to provide a monitor device which includes a sensory or transducer element which is capable of generating a signal in response to low g-level vibrational pulse.

In the prior art, a device known as a piezoelectric accelerometer is available which may be capable of detecting faint vibrational pulses generated by mine detonation. However, one of such devices may cost on the order of several hundred dollars. If it is necessary to dedicate one monitor device to each mine in a test group of 200 mines, as aforementioned, the total cost of all the monitor devices required for a single field test could become prohibitively expensive. Also, it has been found that such accelerometer devices may be unable to provide sufficient accuracy in timing mine self-detonation.

Certain types of capacitor devices are also available in the prior art which may be capable of detecting low g-level vibrational pulses. However, the signals outputted by such capacitors in response to low g-level pulses may be too weak to be employed in a mine detonation monitor device.

In the present invention, a system is provided for monitoring detonation within a mine such as a land mine, wherein a bridge rectifier is employed to detect a low g-level vibrational pulse, and to provide an output signal in response thereto which is of sufficient strength that it may be employed by the monitoring system to indicate the occurrence of detonation. It has been found that a suitable bridge rectifier may be formed by an interconnection of four diodes, so that the cost of the pulse sensing element of the monitor is negligible, in comparison with the cost of the aforementioned piezoelectric accelerometer. The bridge rectifier of the invention is interconnected with several other solid state components to provide a very inexpensive monitoring system which is capable of enabling an observer to visually determine that mine detonation either is occurring or has occurred, and further enables the observer to readily determine the time that has elapsed between mine deployment and mine self-detonation.

SUMMARY OF THE INVENTION

In the present invention, apparatus is provided for monitoring vibrational activity of a source of mechanical vibration. The invention is very useful for monitoring the operation of a self detonating system for a land mine, by detecting a low g-level vibrational pulse as aforementioned. However, it is not intended to limit the scope of the invention to such application. The invention includes bridge rectifier means, which may be placed proximate to the source to provide a voltage output when the source generates a low g-level vibrational pulse, and further includes means coupled to the bridge rectifier means for amplifying the voltage output. A means responsive to the amplified voltage output provides notice when the source generates the vibrational pulse.

Preferably, the apparatus includes a timing means which is responsive to the amplified voltage output for monitoring the time which elapses between the occurrence of a specified event, such event preceding the vibrational pulse, and the occurrence of the vibrational pulse. Such specified event may be, for example, the placement of the apparatus upon a mine which includes a self detonation system. Preferably also, the bridge rectifier means comprises a diode bridge which is acoustically coupled to the detonator device, that is, where a path is provided between the mine and the diodes for the vibrational pulse, to enable the pulse to strain the diodes sufficiently to generate an output signal.

In a preferred embodiment of the invention, the apparatus includes a latch means which is coupled between the amplifier means and the timing means, the latch means commencing operation of the timing means when the aforementioned specified event occurs, and halting operation of the timing means when the diode bridge generates an output signal. The notification means, usefully comprising a flashbulb, is coupled to the latch means to provide visual indication of the occurrence of a vibrational pulse when an output signal is generated. A time display means coupled to the timing means enables the time which elapses between the specified event and the occurrence of a vibrational pulse to be visually displayed.

OBJECTS OF THE INVENTION

An object of the present invention is to provide an improved monitoring system for detecting very low g-level vibrational pulses.

Another object of the invention is to substantially reduce cost in a monitoring system of the above type.

Another object is to provide improved apparatus for detecting the precise time at which the detonator of a selected mine device is activated by a self detonation system contained within the mine.

Another object is to minimize the manpower and cost requirements which are needed to precisely determine the time at which detonation occurs in each mine in a group up to 200 mines which contain self detonation systems, following the deployment of emplacement of the mines in a field environment.

These and other objects of the invention will become more readily apparent from the ensuing specification when taken together with the drawings.

BRIEF DESCRIPTION OF THE DRAWINGS

FIG. 3 is a schematic diagram showing a bridge rectifier device which may be employed as a shock or vibrational pulse sensor in the embodiment of FIG. 1.

DETAILED DESCRIPTION OF THE PREFERRED EMBODIMENT

Figure 1:
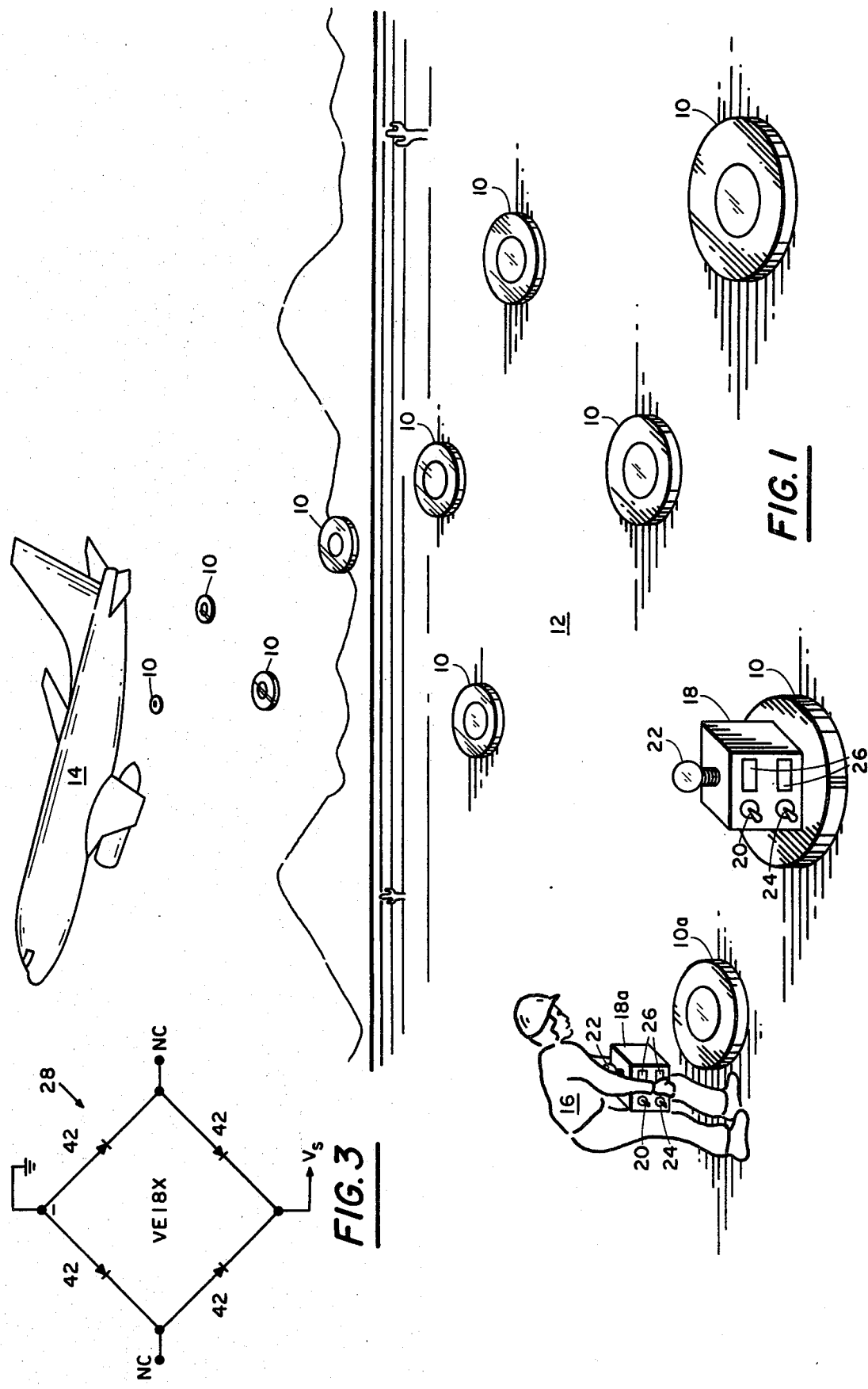
FIG. 1 is a perspective view showing the manner in which an embodiment of the invention may be employed to monitor detonator activity in each mine in a large group of mines which are deployed in a field testing environment.

Referring to FIG. 1, there is shown a group of land mines 10, such as the land mine, being air dropped into a field testing environment 12 from an aircraft 14. The group includes from 100 to 200 mines, none of which contains an explosive charge, but each of which is equipped with a detonator and a system for activating the detonator within a prespecified period, following deployment of the mines in environment 12. The purpose of deploying or inserting mines 10 into environment 12 is to obtain data which indicates the actual periods of time which elapse between the deployment of mines 10 and the respective detonations thereof, such data being compared with the prespecified period, or amount of time which is intended to elapse between deployment and mine detonation. Such prespecified time may be selected from a range which is on the order of several weeks.

Referring further to FIG. 1, there is shown an observer 16 moving through testing environment 12, observer 16 placing a detonation monitor 18, which is structured in accordance with the present invention, upon each deployed mine 10. Each monitor 18 is constructed of inexpensive solid state components, as hereinafter described, so that the total cost for all of the monitors 18 is minimized.

When a monitor 18a is placed upon a mine 10a, the monitor 18a is reset, by means of a reset switch 20, and a timing circuit contained in the monitor commences operation. Usefully, observer 16 records the time elapsing between the air dropping of a mine 10a and the resetting of monitor 18a. When the detonator inside mine 10a is activated by its self detonation system, a vibrational pulse of very low g-level is generated in mine 10a, as aforementioned. Such pulse, which may be on the order of 325 g to 375 g, is detectable by monitor 18a and causes the timing circuit therein to halt operation. Simultaneously, a flashbulb 22 of monitor 18a is activated, whereby observer 16 is informed either that detonation is occurring, by noting a flash of flashbulb 22, or that detonation has occurred, by noting that flashbulb 22 is burned out.

After observing that activation of the detonator of mine 10a has occurred, observer 16 may operate switch 24 to activate an LED display readout 26, which displays the time which elapses during the operation of the aforementioned timing device. By adding such time to the time between the deployment of mine 10a and the resetting of monitor 18a, the total time between the deployment of mine 10a and the activation of the detonator contained therein, by its self detonation system, may be determined.

Figure 2:
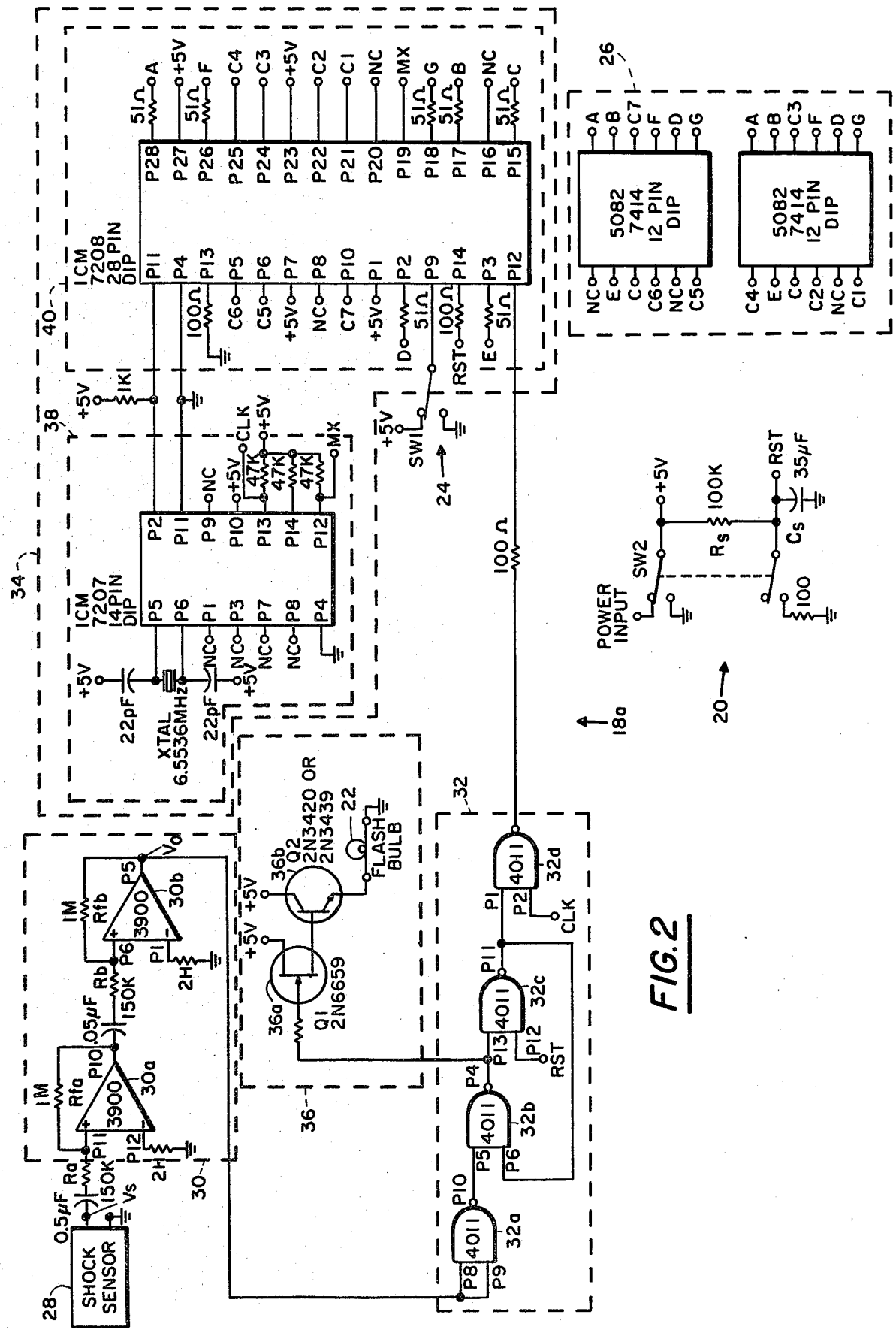
FIG. 2 is a schematic diagram showing the embodiment of FIG. 1.

Referring to FIG. 2, there is shown monitor 18a including a low g shock or vibrational pulse sensor 28, which usefully comprises a bridge rectifier. Monitor 18a further includes an amplifying circuit 30, a latch circuit 32, a timing circuit 34 and LED time readout 26. Reset switch 20 is provided to commence operation of timing circuit 34, as aforementioned, and also to couple a +5 V power source to respective monitor components. A notification circuit 36, comprising two transistors 36a–b configured as a Schmitt trigger, is coupled to latch 32 to operate flashbulb 22. Timing circuit 34 includes a clock circuit 38, which provides 2 millisecond clock pulses at its CLK terminal, and a counter 40. Counter 40 is cleared when a reset (RST) signal is coupled thereto from switch 20, and stores the number of clock pulses it receives after being reset. If counter 40 continuously receives clock pulses after being reset, the length of time following reset will be displayed by LED time readout 26 if switch 24 is operated.

Clock circuit 38 usefully comprises a 6 MHZ crystal controlled clock and a 7207 counter display control chip. Counter 40 comprises a seven decade counter and seven segment LED driver chip 7208, and readout 26 comprises two seven segment LED display chips 5082. Various terminals of LED chips 5082 are coupled to like referenced terminals of chip 7208, the notation "NC" in FIG. 2 indicating "no connection".

Shock sensor 28 is usefully formed by interconnecting four diodes to form a diode bridge, the diode bridge being potted in an aluminum cylinder for ease of handling. The output voltage $V_s$ of the diode bridge, which is shown in FIG. 3, is AC coupled to amplifier circuit 30.

Amplifying circuit 30 is usefully fabricated by connecting two of the operational amplifiers of an LM 3900N quad operational amplifier chip, amplifiers 30a and 30b, in cascade relationship. The gain of amplifier 30a is equal to the ratio of its feedback resistance $R_{fa}$ to its inverting input resistance $R_a$, and the gain of amplifier 30b is similarly equal to the ratio of its feedback resistance $R_{fb}$ to its inverting input resistance $R_b$. The total gain of amplifying circuit 30 is therefore $(-R_{fa}/R_a)(-R_{fb}/R_b)$, and the output voltage $V_o$ of amplifying circuit 30 is $V_o=(-R_{fa}/R_a)(-R_{fb}/R_b)V_s$. As shown in FIG. 2, a useful value for both inverted input resistances $R_a$ and $R_b$ is 150 kohms, and a useful value for feedback resistances $R_{fa}$ and $R_{fb}$ is 1 megohm.

Referring further to FIG. 2, there are shown four NAND gates 32a-32d interconnected to form latch circuit 32, each of the NAND gates usefully comprising one of the gates included in a CD 4011 integrated circuit. Prior to activation of the detonator of land mine 10a, the output voltage of sensor 28 is at a very low voltage, so that amplifier output $V_o$ is also low. $V_o$ is coupled to pins P8 and P9 of chip CD 4011, the two inputs of NAND gate 32a. Consequently, when observer 16 places monitor 18a upon mine 10a and activates reset switch 20, the output of NAND gate 32a is logic 1, which is coupled as a first input to NAND gate 32b. FIG. 2 shows reset switch 20 including an RC series network, comprising resistor $R_s$ and $C_s$, the aforementioned reset signal comprising the voltage across capacitor $C_s$.

Since the voltage across capacitor $C_s$ is 0V. just prior to switch activation, it must also be 0V. right after, such voltage being coupled as an input to NAND gate 32c. The output of NAND gate 32c is therefore logic 1 when switch 20 is activated, such output being coupled as a first input to NAND gate 32d. NAND gate 32d is thereby enabled to couple its second input, comprising clock pulses from clock circuit 38, to counter 40, successive clock pulses being registered thereby. The number of pulses stored in counter 40 therefore indicates the amount of time which passes from the activation of switch 20 to the disablement of NAND gate 32d, which occurs when the first input to NAND gate 32d goes to logic 0, holding the output thereof at logic 1.

It will be seen from FIG. 2 that the output of NAND gate 32c is coupled through a feedback loop to pin P6, the second input to NAND gate 32b. Since, as aforementioned, the first input to NAND gate 32b is logic 1 when switch 20 is activated, the output of NAND gate 32b goes to logic 0 upon activation of the switch, such output being coupled as an input to NAND gate 32c. By judicious selection of respective values for $R_s$ and $C_s$, capacitor $C_s$ can be made to charge to a voltage which is on the order of 4 V. in a time period which is on the order of 0.1 second. Thereupon, the RST input to NAND gate 32c transits from logic 0 to logic 1. However, because of the logic 0 output of NAND gate 32b which is established by such time, the output of NAND gate 32c remains at logic 1.

When detonation occurs within mine 10a, that is, when the self detonation system therein activates the detonator thereof, a pulse of vibrations having g-levels which may be no greater than 325 g is generated. The vibrational pulse places stresses on the diodes which form shock sensor 28, causing a non-zero voltage $V_s$ to be generated and coupled to amplifying circuit 30. $V_s$ is of such magnitude that amplified voltage $V_o$, provided in response thereto, is at the logic 1 level of NAND gate 32a. The output of NAND gate 32a therefore goes to logic 0 when detonation occurs, so that the output of NAND gate 32b does to logic 1. Such logic 0 to logic 1 transition causes notification circuit 36 to ignite or activate flashbulb 22. In addition, such transition causes the output of NAND gate 32c to go from logic 1 to logic 0, disabling NAND gate 32d from coupling further clock pulses to counter 40. Consequently, at any time after detonation of landmine 10a has occurred, the contents of register 40 will represent the time elapsing between the resetting of monitor 18a, when it is first placed in contact with mine 10a by observer 16, and the activation of the detonator of mine 10a. Such time may be readily determined by activating display switch 24 and observing the time shown by LED time readout 26.

Referring to FIG. 3, there are shown four diodes 42 interconnected to form a rectifier bridge which, as aforementioned, is usefully employed as shock sensor 28. Such diode bridge may comprise, for example, a VE18X integrated circuit chip. It has been found that such diode bridge is very sensitive to a mechanical vibrational pulse which is very slight. At the same time, it is capable of generating a voltage in response to such pulse which is strong enough to signal an electronic circuit that the pulse has occurred.

While the above embodiment of the invention has been found to be very useful in monitoring self detonation in land mines, it is anticipated that such embodiment may be readily adapted by those of skill in the art to monitor mines which are deployed in a marine environment. It further is anticipated that modifications of the above embodiment may also be employed to monitor low g-level vibrational pulses which are generated by sources other than explosive mine devices.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for monitoring vibrational pulse activity of an explosive detonator device, said vibrational pulse activity having generated when said explosive detonator is activated, said apparatus comprising:

a diode bridge rectifier proximate to said explosive detonator device and acoustically coupled thereto for providing a voltage output when activations of explosive detonator device generates mechanical vibrations of very low g-level over a brief time interval, means coupled to said bridge rectifier means for amplifying said voltage output;

timing means responsive to said amplified voltage output for monitoring the time which passes between the occurrence of a specified event, which precedes said vibrational pulse, and the occurrence of said vibrational pulse;

latch means coupled between said amplifier means and said timing means for enabling said timing means to commence monitoring the passage of time when said specified event occurs, and for preventing said timing means from monitoring the passage of time when said diode bridge rectifier provides said voltage output; and means responsive to said amplified voltage output for providing notice when said explosive detonator generates said vibrational pulse.

2. The apparatus of claim 1 wherein:
said notification means is coupled to said latch means; and
said notification means includes means activated by said output voltage for providing visual indication of the occurrence of said vibrational pulse.

3. The apparatus of claim 2 wherein:
said visual indicator means comprises a flashbulb; and
a time display means is coupled to said timing means for enabling the time between said first and second events to be visually displayed.

4. The apparatus of claim 1 wherein said timing means comprises:
clock means for generating a train of clock pulses of selected time width; and
counter means for receiving and counting a portion of the clock pulses of said train.

5. The apparatus of claim 1 wherein said detonator device is contained within a mine device, and wherein:
said latch means comprises a latch formed of logic gates for coupling said train of clock pulses to said counter means when said specified event occurs and for uncoupling said clock pulse train from said counter means when said vibrational pulse occurs, said specified event comprising the placement of said apparatus in adjacent relationship with said mine device.

6. Apparatus for monitoring vibrational shocks of very low g-level, said apparatus comprising:
a plurality of diodes interconnected to form a rectifier bridge, said diodes comprising means for cooperating with one another to generate a prespecified minimum output voltage when said diodes are strained by a vibrational shock having a lower limit which is on the order of 325 g;
amplifying means receiving said output voltage for amplifying said output voltage to a predetermined minimum level;
clock means for providing a train of clock pulses of prespecified time width;
counter means for selectively receiving and counting pulses of said train of clock pulses;
latch means coupled to said amplifying means and receiving said train of clock pulses for coupling said train of clock pulses to said counter means at a time prior to the occurrence of a vibrational shock, and for uncoupling said train of clock pulses from said counting means when said amplifying means provides said minimum voltage level; and
means coupled to said latch means for providing a visual indication of the occurrence of a vibrational shock when said latch means receives said amplified voltage from said amplifying means.

7. The apparatus of claim 6 wherein said apparatus includes:
display means for visually indicating the period of time during which said counter means receives said train of clock pulses from said latch means; and
means coupled to said display means for enabling selective activation and deactivation of said display means.

8. The apparatus of claim 7 wherein:
said rectifier bridge is contained within a protective aluminum cylinder; and
said diode bridge rectifier, said amplifying means, said counter means and said latch means each comprises a discrete integrated circuit chip; and
said clock means comprises a crystal oscillator of selected frequency and a discrete integrated circuit chip.

* * * * *